(12) United States Patent
Courtois et al.

(10) Patent No.: US 9,206,930 B2
(45) Date of Patent: Dec. 8, 2015

(54) DEVICE FOR PROTECTING A FEMALE END OF A THREADED TUBULAR CONNECTION COMPONENT, HAVING AN ANTI-UNSCREWING BRAKE

(75) Inventors: Sebastien Courtois, Oyonnax (FR); Roque Pineda, Veracruz (MX); Erwan Cadiou, Quimper (FR); Eric De Maigret, Valenciennes (FR)

(73) Assignees: VALLOUREC OIL AND GAS FRANCE, Aulnoye-Aymeries (FR); VALLOUREC OIL & GAS MEXICO, SA DE CV, Veracruz (MX)

( * ) Notice: Subject to any disclaimer, the term of this patent is extended or adjusted under 35 U.S.C. 154(b) by 792 days.

(21) Appl. No.: 12/527,480

(22) PCT Filed: Feb. 14, 2008

(86) PCT No.: PCT/FR2008/000190
§ 371 (c)(1),
(2), (4) Date: Aug. 20, 2009

(87) PCT Pub. No.: WO2008/116986
PCT Pub. Date: Oct. 2, 2008

(65) Prior Publication Data
US 2011/0148103 A1    Jun. 23, 2011

(30) Foreign Application Priority Data
Feb. 21, 2007    (FR) ..................................... 07 01222

(51) Int. Cl.
*F16L 15/00* (2006.01)
*F16L 58/18* (2006.01)
*F16L 57/00* (2006.01)

(52) U.S. Cl.
CPC ............. *F16L 15/001* (2013.01); *F16L 15/004* (2013.01); *F16L 57/005* (2013.01); *F16L 58/182* (2013.01)

(58) Field of Classification Search
USPC ................................. 285/333–334, 355, 390
See application file for complete search history.

(56) References Cited

U.S. PATENT DOCUMENTS 2,239,942 A * 4/1941 Stone et al. ................... 285/110
4,494,777 A    1/1985 Duret
(Continued)

FOREIGN PATENT DOCUMENTS

| DE | 100 55 142 | 5/2002 |
|---|---|---|
| EP | 0 148 807 | 7/1985 |
| EP | 0 488 912 | 6/1992 |

(Continued)

OTHER PUBLICATIONS

U.S. Appl. No. 12/519,434, filed Jun. 16, 2009, Courtois, et al.

*Primary Examiner* — Aaron Dunwoody
*Assistant Examiner* — Fannie Kee
(74) *Attorney, Agent, or Firm* — Oblon, McClelland, Maier & Neustadt, L.L.P.

(57) ABSTRACT

A device configured to protect a female end of a component of a threaded tubular connection for drilling and working a hydrocarbon well, including an internal threading, an annular end, and internal surfaces respectively upstream and downstream of the internal threading and respectively having first and second selected orientations. The device includes a body including an external threading to cooperate with the internal threading and first and second flexible annular sealing elements respectively upstream and downstream of the external threading to provide first and second seals respectively at the internal and end annular surfaces. The first and second sealing elements have selected third and fourth orientations at least one of which differs by at least 10° from the corresponding second or first orientation before screwing the device onto the female end, and are deformable by axial bending to acquire, by surface contact with the internal annular surface and the annular end surface, an energy at least partially opposing any unintentional unscrewing when the female end is screwed onto the body in a final position.

16 Claims, 6 Drawing Sheets

(56) References Cited

U.S. PATENT DOCUMENTS

| | | | |
|---|---|---|---|
| 4,629,221 A * | 12/1986 | Lumsden et al. | 285/328 |
| 4,796,668 A | 1/1989 | Depret | |
| 4,818,167 A * | 4/1989 | Hatsutori | 411/386 |
| 4,838,491 A | 6/1989 | Bennett et al. | |
| 5,964,486 A * | 10/1999 | Sinclair | 285/331 |
| 6,027,145 A | 2/2000 | Tsuru et al. | |
| 6,869,111 B2 | 3/2005 | Goto et al. | |
| 6,933,264 B2 | 8/2005 | Petelot | |
| 7,469,721 B2 * | 12/2008 | Takano | 138/96 T |
| 2006/0042709 A1 | 3/2006 | Takano | |

FOREIGN PATENT DOCUMENTS

| | | |
|---|---|---|
| EP | 0 767 335 | 4/1997 |
| EP | 1 211 451 | 6/2002 |
| GB | 1 428 433 | 3/1976 |
| JP | 49-51622 | 5/1974 |
| JP | 52-11768 | 1/1977 |
| JP | 59-54883 | 3/1984 |
| JP | 60-84488 | 5/1985 |
| JP | 8-291887 | 11/1996 |
| JP | 2003-506602 | 2/2003 |
| JP | 2005-536691 | 12/2005 |
| WO | 03/102457 | 12/2003 |

* cited by examiner

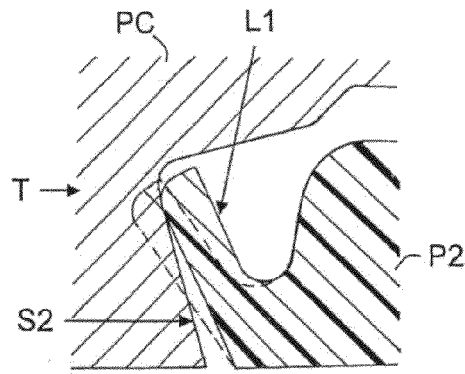 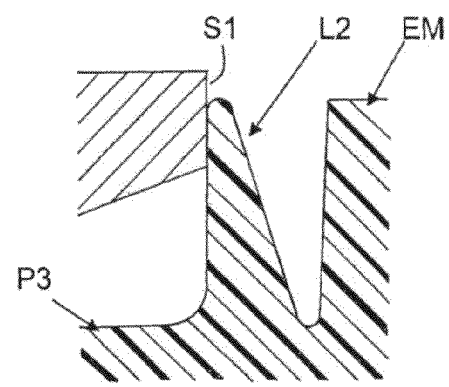
FIG. 9A　　　　　　　　FIG. 9B
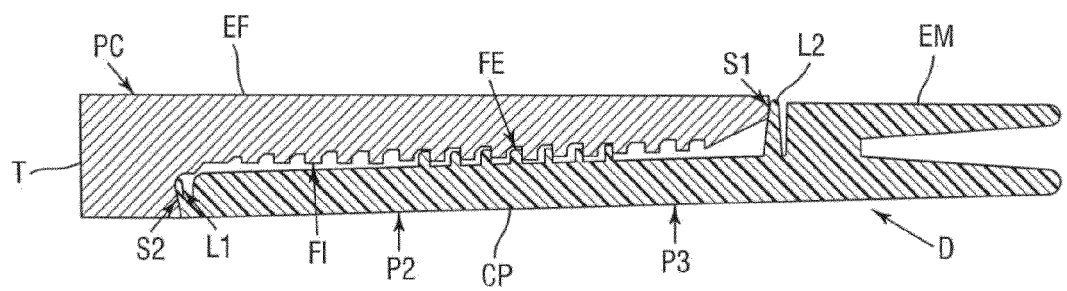
FIG. 10
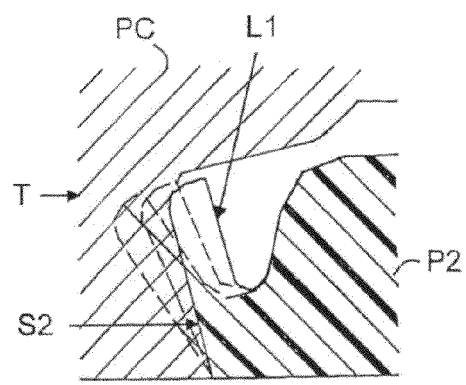 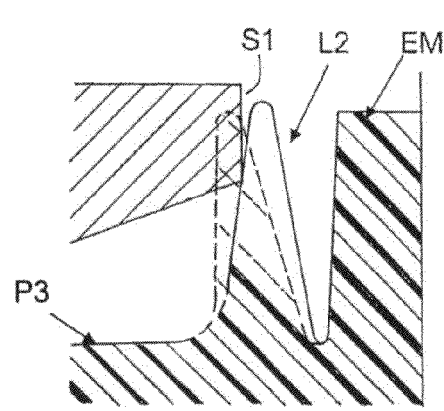
FIG. 11A　　　　　　　　FIG. 11B

DEVICE FOR PROTECTING A FEMALE END OF A THREADED TUBULAR CONNECTION COMPONENT, HAVING AN ANTI-UNSCREWING BRAKE

BACKGROUND OF THE INVENTION

1. Field of the Invention

The invention relates to threaded tubular connection components used, for example, in oil applications, and more precisely relates to protecting the female end of certain of such components.

The term "component" as used here means any element or accessory used to drill or operate a well and intended to be connected by means of a threading to another component to constitute a threaded tubular connection with that other component. The component may, for example, be a relatively great length tube (in particular about ten meters in length), a tubular coupling a few tens of centimeters long, an accessory for such tubes (a hanger, a cross-over, a safety valve, a tool joint, a sub or the like).

2. Description of Related Art

The components are generally connected to each other for dropping into a hydrocarbon or the like wells and constitute a drill string, a casing string, or liner string or a tubing string (working strings)

Specification API 5CT from the American Petroleum Institute (API), equivalent to International Standard ISO 11960: 2004 from the International Standardisation Organisation (ISO) governs tubes used as casing or tubing, and specification API 5B defines standard threadings for such tubes.

API specification 7 defines threaded joints with a shoulder for rotary drill rods.

The manufacturers of threaded tubular connection components have also developed premium threaded connections which have threadings with specific geometries, and specific means providing them with better performance in service, in particular as regards mechanical strength and seal. Examples of such premium threaded connections and those specific means are described in patents EP 488 912, U.S. Pat. No. 4,494,777 and EP 0 767 335.

The components cited above include a threaded female end which is intended to be made up into a threaded male end of another drilling or working component. Thus, it is vital that their female end be damaged, polluted or deteriorated as little as possible from the moment they leave their production line to the moment of use, and also between two successive uses. It will be understood that it is necessary to protect not only the internal threading but also the annular surface or surfaces (sealing or abutment) which each have specific and complementary functions, in particular as regards providing a seal during use, against corrosion, dust and shocks (or blows).

The ends of said components are generally coated just before coupling with a grease with anti-galling properties. API RP 5A3 (formerly API Bul 5A2) or ISO 13678: 2000 defines such greases and the modes of application of such greases are described in API RP 5C1. However, the greases in document API RP 5A3 suffer from a number of disadvantages linked to their toxic constituent content, in particular lead, to the excess quantity of grease applied and to the need to apply the grease just prior to dropping the components into the well.

Thus, in particular in patent documents U.S. Pat. No. 6,933,264, U.S. Pat. No. 6,869,111 and WO 2003/102457, it has been proposed to replace the grease applied with a brush at the completion of production to the end of the component by a factory-applied thin layer of a predetermined thickness of a "semi-dry" lubricant which is free of heavy metals. Particularly in patent documents U.S. Pat. No. 6,027,145, EP 1 211 451 and FR-05/10503 (unpublished patent application), it has been proposed to replace the grease applied with a brush at the end of production to the end of the component by a factory-applied thin layer of a predetermined thickness of a dry lubricant based on particles of solid lubricants.

In those cases in which a dry or semi-dry lubricant is factory-applied, it is also and even more necessary to protect the layer of lubricating product with which the ends of the component are coated as much as possible as well from mechanical removal as from pollution (sand, debris) which are prejudicial to the effectiveness of the lubricating product.

To obtain such protection, in general, as required by specification API 5CT (paragraph 12.2), a protective device is placed on the male and female ends of the threaded tubular connection components. Many devices of that type have been proposed for the female ends, in particular in patent documents EP 0 148 807 and US-2006/0042709.

This latter document more particularly aims at protectors for connections which have been previously coated with a lubricant applied in the factory. The protector described comprises a body provided with, on the one hand, an external threading intended to cooperate with the internal threading of the female end to be protected, and on the other hand, first and second annular type flexible sealing elements placed respectively downstream and upstream of the external threading and intended to provide first and second seals at the respective internal and end annular surfaces which are placed upstream and downstream of the internal threading of the female end. The first sealing element is intended to envelope the zone containing the internal annular surface of the female end while providing a bearing seal. As it is relatively bulky, it is poorly adapted for accommodating dimensional differences between the female end and/or its protector resulting from manufacture and/or temperature variations. Further, it can deform in the event of large temperature variations and thus no longer be in intimate contact with the internal annular surface of the female end, thus encouraging spontaneous unscrewing of the protector in the presence of vibrations, primarily generated during transport and/or temperature variations that may vary from −40° C. to +80° C.

BRIEF SUMMARY OF THE INVENTION

Thus the aim of the invention is to improve the situation.

To this end, it proposes a device which on the one hand is intended to protect the female end of a component of a threaded tubular connection for drilling and working hydrocarbon wells, which female end is internally provided with at least one internal threading and an annular end surface and an internal surface (which may be annular) placed respectively upstream and downstream of the internal threading and respectively having first and second selected orientations, and which on the other hand comprises a body provided with an external threading intended to cooperate with the internal threading and first and second annular type flexible sealing elements placed respectively upstream and downstream of the external threading intended to provide the first and second seals respectively at the internal surface and at the annular end surface of the female end.

The annular end surface is in this case the portion which is most upstream of the female end. As a result, everything after this annular end surface is located downstream. The annular end surface is thus placed upstream of the internal threading, while the internal surface (which may be annular) is placed downstream of this internal threading. Similarly, the first sealing element is the most upstream portion of the body (protector) of the device. As a result, the first sealing element is placed upstream of the external threading while the second sealing element is placed downstream of said external threading.

This device is characterized in that its first and second sealing elements on the one hand, have selected third and fourth orientations at least one of which differs by an angle of at least 10° from the second or first orientation which corresponds thereto (before screwing the device onto the female end) and on the other hand also are deformable by axial bending in order to acquire, by surface contact with the internal annular surface and the annular end surface of the female end, an energy which at least partially opposes any unintentional unscrewing (anti-unscrewing brake effect) when said female end is screwed onto the body into a final position the first sealing element may be produced in the form of an annular tongue. In this case, the annular tongue of the first sealing element may be connected to the body (protector) via the interior periphery thereof and may project outwardly. The manufacturing by molding is thereby made easy. The annular tongue is well protected against elements coming from the interior of the tube and capable of an accidental deterioration thereof. In case of increase of the atmosphere pressure, the annular tongue may let air pass through so as to balance the pressures. One avoids a sticking of the device on a female element making the unscrewing hard.

The protective device of the invention may exhibit a number of variations, at least some of the features of which may be combined together, and in particular:

the internal surface of the female end may be an annular abutment surface;

its body may be arranged so that during the screwing on phase, the first sealing element comes into contact with the internal annular surface of the female end before the second sealing element comes into contact with the annular end surface of this same female end;

its body may be arranged so that when screwing on and at the moment the first sealing element comes into contact with the internal annular surface of the female end, the second sealing element is positioned at an axial distance from the annular end surface of that same female end which is in the range from about 0.5 mm to about 1 mm;

the first and fourth orientations may, for example, differ by an angle in the range 10° to about 30°. As an example, this angle is about 15°;

in a variation or in a complementary manner, the second and third orientations may, for example, differ by an angle in the range 10° to about 30°. As an example, this angle is about 15°;

the angle between the second and third orientations may reduce during screwing on;

the second sealing element may be produced in the form of an annular tongue;

its body may be extended downstream of the second sealing element by a bumper element;

it may be produced from a thermoplastic material, for example as a one-piece moulding. This thermoplastic material may, for example, be selected from the group comprising at least mixtures based on polycarbonate, polyoxymethylene or polyacetal (POM), and high density polyethylenes (PE-HD) or ultra high density polyethylenes (PE-UHD);

its first and second sealing elements may be integral with its body (protector);

the internal surface of the female end may be a sealing surface with radial interference fit.

BRIEF DESCRIPTION OF THE SEVERAL VIEWS OF THE DRAWINGS

Other characteristics and advantages of the invention will become apparent from an examination of the following detailed description and accompanying drawings in which:

FIGS. 9A and 9B are enlargements of the connection zones [protective device/female end] of FIG. 8, respectively comprising the first and second sealing elements;

FIG. 10 is a diagrammatic partial sectional view along axis XX of the component of a fifth (final) stage of connection onto the female end in FIG. 1 of the protective device of FIG. 1 provided with the first and second sealing elements shown in FIGS. 3A-3B and 4A-4B;

FIGS. 11A and 11B are enlargements of the connection zones [protective device/female end] of FIG. 10, respectively comprising the first and second sealing elements.

Figure 1:
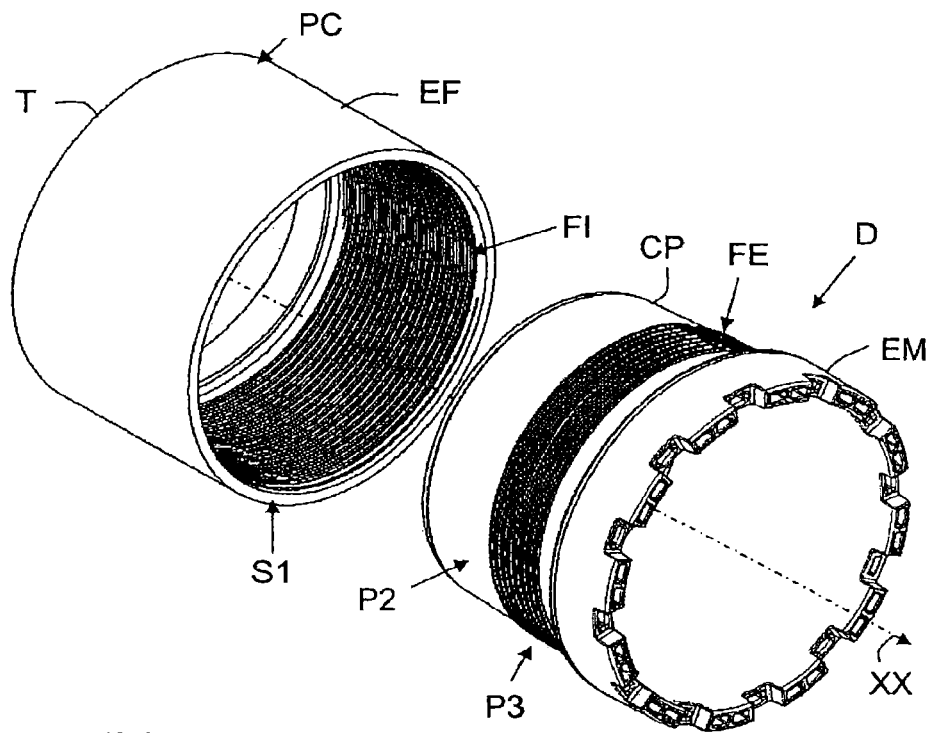
FIG. 1 is a diagrammatic perspective view of an embodiment of a protective device of the invention and an embodiment of a female end of a VAM TOP type threaded tubular connection.
Figure 2:
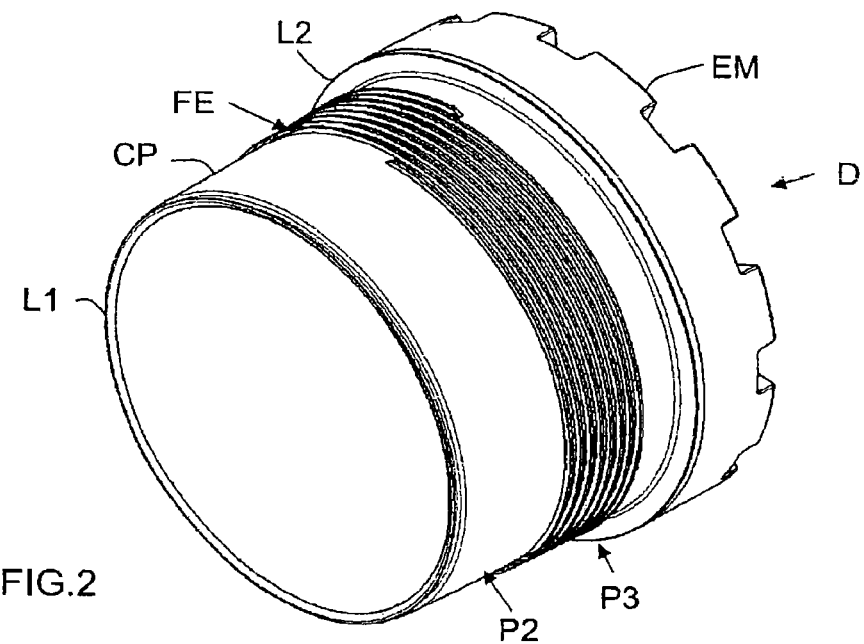
FIG. 2 is a diagrammatic perspective view of the embodiment of the protective device of FIG. 1.

The accompanying drawings not only serve to complete the invention but also contribute to its definition as necessary.

DETAILED DESCRIPTION OF THE INVENTION

The aim of the invention is to limit the possibilities of spontaneous unscrewing of a device intended to protect the threaded female end of a tubular component of a threaded tubular connection (intended for drilling or working of hydrocarbon wells or the like wells) against mechanical damage, pollution (chemical or material) and deterioration (corrosion) between the moment it leaves the production line and the moment of use (with a number of possible screwing-unscrewing operations for the protective device), but also between two successive uses.

In the following, it will be assumed that the component is intended for drilling or working of a hydrocarbon well and it is provided with a female end of a coupled or integral threaded tubular connection of the VAM (trade mark) family or equivalent. However, the invention is not limited to that type of component, nor to that type of female end. In fact, the invention concerns any type of component of a threaded tubular connection for drilling or working provided that it has a female end provided with at least one internal threading and an annular end surface and an internal surface (also annular in the case of a VAM TOP type connection) placed respectively upstream and downstream of the internal threading and respectively having selected first and second orientations.

Further, the term "female end" as used here means a female end of a component (tube, coupling or accessory) provided with an internal threading and an annular end surface and an internal surface (also annular in the case of a VAM TOP type connection) placed respectively upstream and downstream of the internal threading. The term "female end" (EF) thus does not only refer to the annular end surface located at the free end of the component (T), but also refers to the whole portion of the component (T) which includes the (female) means for connection to another component of the threaded tubular connection provided with male connection means (male end).

It will be recalled that a component (T) comprises a body or regular section (PC) terminated by a female end (EF) or a male end.

The internal threading may be formed in one or more distinct threaded portions disposed on cylindrical or tapered surfaces.

When the threaded portion is tapered, it may be sub-divided into a sub-portion with "perfect" threads the profile of which is constant and without irregularity or imperfection (for example of the burr type) and a sub-portion which has vanishing or imperfect threads with a gradually decreasing height and a profile which may have irregularities or imperfections.

The internal threading of the female end of the component may comprise at least two distinct threaded portions which are axially and/or radially distant from each other, each of these portions possibly comprising perfect and vanishing threads.

The female end of the component comprises a free terminal portion which terminates in an annular end surface having a first orientation. This latter is substantially transverse with respect to the direction (XX) of the component (coupling) in the case of a VAM TOP type connection (it thus defines an angle which is zero or very small with respect to the plane perpendicular to the direction XX).

This female end also comprises at least one internal annular surface (i.e. disposed near the interior peripheral surface of the component T) (in the example of a VAM TOP type connection under consideration) thus defining a recess for a male end of another component intended to be assembled with the component under consideration. It may optionally also comprise one or more metal/metal sealing surfaces (at the free end, downstream of the external threading or between two threaded portions) with the male end under consideration. The protective device of the invention is preferably designed to protect both the threading and the sealing surfaces and if possible at least one of the annular end S1 and internal S2 surfaces from damages or shocks, dust and/or corrosion.

The term "exterior" as used here means an element disposed along a surface (or a surface) which is orientated in a radial direction opposite to the axis XX of the female end. Similarly, the term "interior" as used here means an element (or a surface) which is orientated towards the axis XX of the female end.

The internal annular surface has a second orientation. This latter makes a non-zero angle ($\Phi2$) (for example of the order of 15°) with respect to a plane perpendicular to the direction (XX) of the component in the case of a VAM TOP type connection (it thus defines an annular axial abutment surface of an inverse internal abutment).

The embodiments discussed below, given by way of non-limiting examples, all relate to a female end of a coupling for a VAM TOP (trade mark) coupled threaded tubular connection. However, it is also applicable to other types of threaded connection with or without a coupling.

Reference will initially be made to FIGS. 1 to 5 to present the invention and describe the use of this embodiment.

A protective device D of the invention comprises a body CP intended to be screwed onto the (threaded) female end EF of a component T.

The body CP is produced in the form of a monoblock sleeve. It is intended to protect the internal threading FI of the female end EF and its annular end S1 and internal S2 surfaces which respectively exhibit first and second orientations. It comprises a terminal portion P2 provided at its end with a first annular type flexible sealing element L1 intended to provide a first seal at the internal annular surface S2 of the female end EF when its device D is placed in a final position (shown in FIGS. 10 to 12). This terminal portion P2 is extended on the side opposite to the first sealing element L1 by an intermediate portion P3 containing an external threading FE on which the internal threading FI of the female end EF may be engaged. This intermediate portion P3 also comprises a flexible annular type second sealing element L2 intended to provide a second seal at the annular end surface S1 of the female end EF when its device D is placed in its final position (shown in FIGS. 10 to 12).

According to the invention, the first L1 and second L2 sealing elements are deformable by axial bending to acquire, by surface contact respectively with the internal annular surface S2 and the annular end surface S1, an energy which at least partially opposes unintentional (or spontaneous) unscrewing of the device D (in the presence of vibrations generated in particular during transport and/or variations in temperature), when the female end EF is screwed onto the body CP into the final position. This anti-unscrewing brake effect resulting from energy acquisition will be discussed further below.

Preferably, and as shown in FIGS. 1, 2, 4 and 5, the intermediate portion P3 is preferably extended on the side opposite to the terminal portion P2 by a bumper element EM which is deformable so that it can absorb shocks. The exterior diameter of the bumper element EM is advantageously close to that of the female end EF.

Figure 3A:
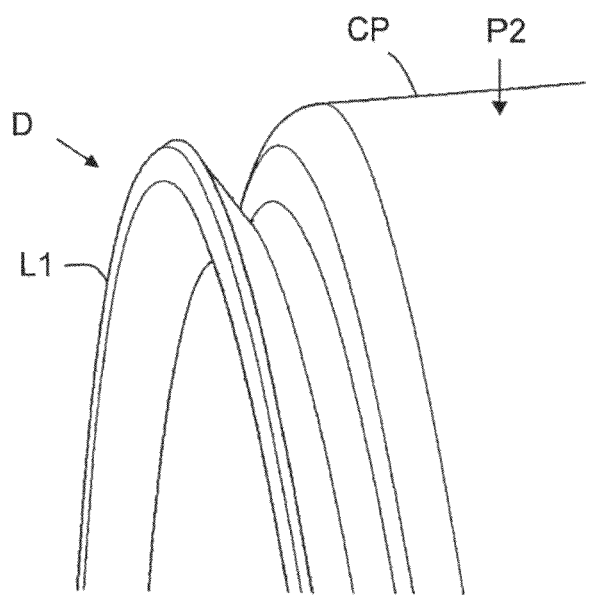
FIGS. 3A and 3B are respectively a perspective diagrammatic view and a cross section view along axis XX of the component, of an embodiment of a first sealing element of the protective device of FIGS. 1 and 2.
Figure 3B:
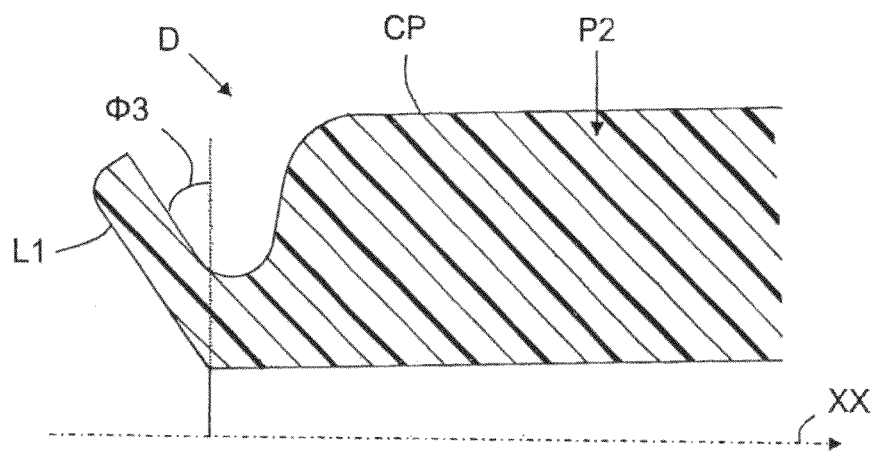

As an example and as shown in FIGS. 3 and 5, the first sealing element L1 is a radial outward projection in the form of a collar (or tongue or leaf) intended to come into intimate contact against at least a portion of the internal annular surface S2 of the female end EF, in order to provide a (first) continuous local seal over the whole circumference at this position when its device D is placed in its final position. Tongue L1 is preferably integral with the body (protector) CP and is preferably attached thereto close to its interior surface (or periphery). The ratio between the (radial) height and the thickness of the tongue (or collar) L1 is preferably more than 1. As an example, it may be of the order of 3.

The first sealing element L1 initially presents a third orientation which depends on the type of connection of which the female end EF forms part and for which the device D is intended. In the example shown in FIGS. 3 and 5, which corresponds to a device D intended to protect a VAM TOP type connection, the third orientation defined by the orientation of the front (upstream) face of the tongue L1 directed towards the internal annular surface S2, initially (i.e. before mounting the device D on the female end EF) makes a non-zero angle $\Phi 3$ with the plane perpendicular to the direction XX of the component T. This angle $\Phi 3$ is initially more than the angle $\Phi 2$ of the second orientation of the internal annular surface S2 of the female end EF by at least 10°. Preferably, the initial angular difference ($\Delta = \Phi 3 - \Phi 2$) between the third and second orientations is in the range +10° to about +30°. More preferably, this initial angular difference A is equal to about +15°. The angle $\Phi 3$ is selected so that initial contact between the tongue L1 and the internal annular surface S2 takes place on the exterior side of the tongue L1.

As shown in FIGS. 10 and 11A, when device D is intended to protect a VAM TOP type connection, its first sealing element L1 covers the major portion of the internal annular surface S2 of the female end EF while being in intimate contact against it once placed in the final position. The collar (or tongue or leaf) which constitutes the first sealing element L1 in this case comprises two substantially parallel annular faces initially both having the third orientation, one of them being separated from the remainder of terminal portion P2 of the body CP by a relatively broad V-shaped valley (see FIG. 3B) in order to allow it to bend axially when device D is placed into its final position and to compensate for dimensional differences (in manufacture and/or caused by temperature variations).

Figure 4A:
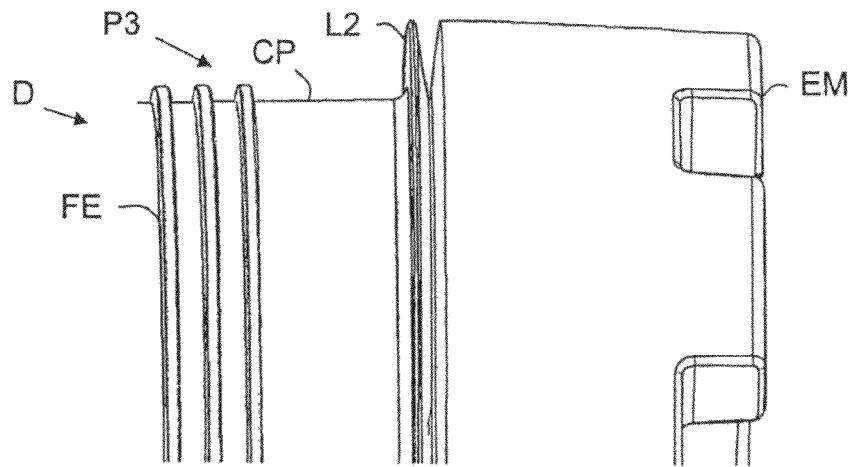
FIGS. 4A and 4B are respectively a perspective diagrammatic views and a cross section view along axis XX of the component, of an embodiment of a second sealing element of the protective device of FIGS. 1 and 2.
Figure 4B:
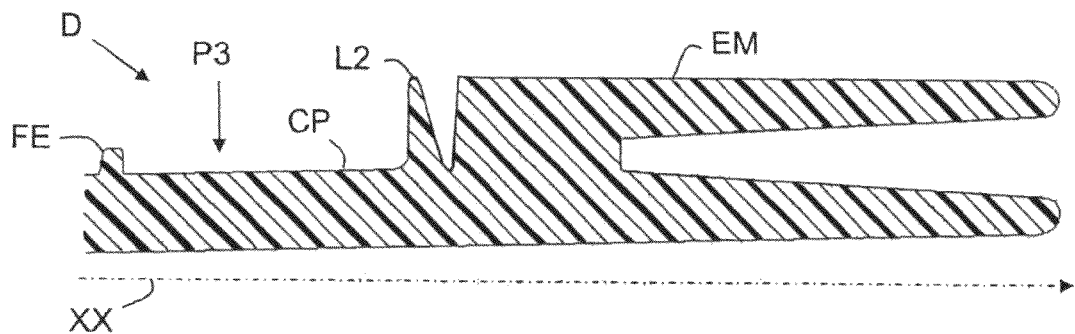

As an example and as shown in FIGS. 4 and 5, the second sealing element L2 is also a radial outward projection in the form of a collar (or tongue or leaf) intended to come into intimate contact against at least a portion of the annular end surface S1 of the female end EF, in order to provide a (second) continuous local seal over the whole circumference at this position when its device D is in its final position. The tongue (or collar) L2 is preferably integral with the body (protector) CP and is preferably attached thereto close to its exterior surface. The ratio between the (radial) height and the thickness of the tongue L2, measured substantially at the mid-height thereof, is preferably more than 1. As an example, it may be selected to be of the order of 3.

The second sealing element L2 initially has a fourth orientation (defined by the orientation of the face of the tongue L2 directed towards the annular end surface S1) which depends on the type of connection of which the female end portion EF forms part and for which the device D is intended. In the example shown in FIGS. 4 and 5, which corresponds to a device D intended to protect a VAM TOP type connection, the fourth orientation initially (i.e. before mounting device D on the female end EF) makes a zero or very small angle D4 with respect to the plane perpendicular to the direction XX of the component T so that the angular difference is zero or very small. The collar (or tongue or leaf) which constitutes the second sealing element L2 thus comprises two annular faces making an acute angle between them (see FIG. 4B) so that the thickness of the collar L2 reduces outwardly, the inclined face being separated from the remainder of the intermediate portion P3 of the body CP by a relatively narrow V-shaped valley to allow it to bend axially when placing the device D in its final position and to compensate for dimensional differences (in manufacture and/or induced by temperature variations). As a result, and as shown in FIGS. 10 and 11B, when device D is in its final position, its second sealing element L2 is in intimate contact only against a small portion of the annular end surface S1 of the female end EF.

It will be noted that when the device D is intended to protect a connection of a type which differs from a VAM TOP connection, the fourth orientation may initially make a non-zero angle with respect to the plane perpendicular to the direction XX of component T. This angle is initially larger than that made by the second orientation of the annular end surface S1 of the female end EF by at least 10°. Preferably, the initial angular difference between the fourth and first orientations is in the range +10° to +30°. Still more preferably, this initial angular difference A is about +15°.

The respective dimensions of the various portions (P2, P3) constituting the body CP are selected so that during the screwing on phase shown in FIGS. 5 to 10, the first sealing element L1 comes into contact with the internal annular surface S2 of the female end EF before the second sealing element L2 comes into contact with the annular end surface S1 of this same female end EF. This is illustrated in the non limiting example of FIGS. 5 and 6. More precisely, in this example, after having introduced the body CP substantially axially into the interior of the female end EF so that the start of its external threading FE comes in front of the internal threading FI of the female end EF (FIG. 5A—first intermediate stage of screwing on), device D (FIG. 5B—second intermediate stage of screwing on) is screwed on until its first sealing element L1 comes into contact with the internal annular surface S2 of the female end EF (FIGS. 5C and 6A—third intermediate stage of screwing on). At this third intermediate stage of screwing on, contact between the tongue L1 and the internal annular surface S2 is made close to the outermost portion of the tongue L1, and the second sealing element L2 is placed at a certain axial distance DA from the annular end surface S2 (see FIGS. 5C and 6B). This axial distance DA is preferably in the range from about 0.5 mm to about 1 mm, more preferably about 0.7 mm.

Figure 7:
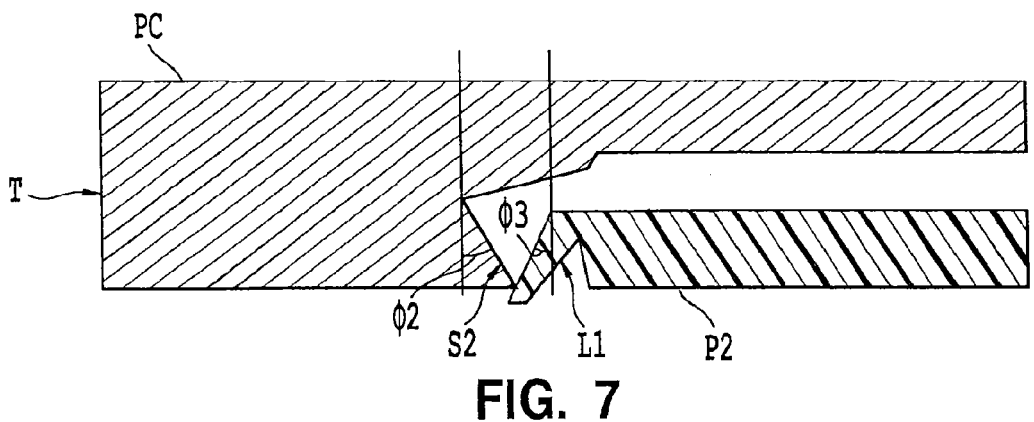
FIG. 7 is a diagrammatic sectional view of the component.
Figure 8:
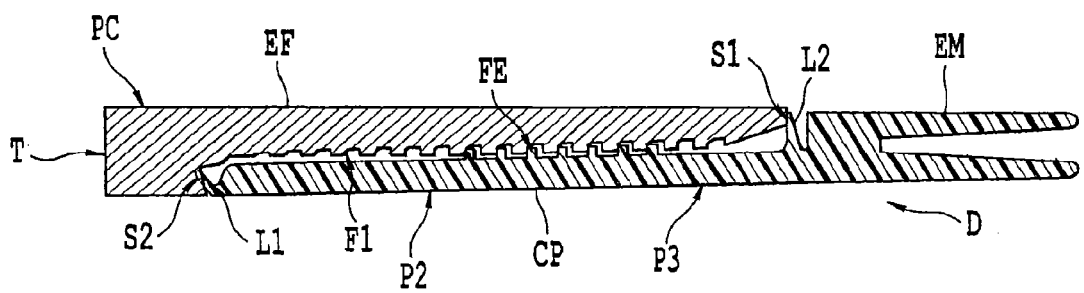
FIG. 8 is a diagrammatic partial sectional view along axis XX of the component of a fourth intermediate stage of connection onto the female end in FIG. 1 of the protective device of FIG. 1 provided with the first and second sealing elements shown in FIGS. 3A-3B and 4A-4B.

Next, and as shown in FIGS. 7, 8 and 9, device D continues to be screwed on until the substantially transversely orientated face of the second sealing element L2 comes into contact with the annular end surface S1 of the female end EF (see FIGS. 7 and 9—first final stage of screwing on). As shown in FIG. 8, this constrains the first sealing element L1 to start to bend axially (its initial non bended position is shown in dashed lines). Next, the device D continues to be screwed on so that on the one hand it further increases the axial bending of the first sealing element L1 (see FIG. 11A—the intermediate bended positions are shown by the dashed lines) and on the other hand to constrain the second sealing element L2 to bend axially (see FIG. 11B—its initial non bended position is shown in dashed lines).

Figure 12:
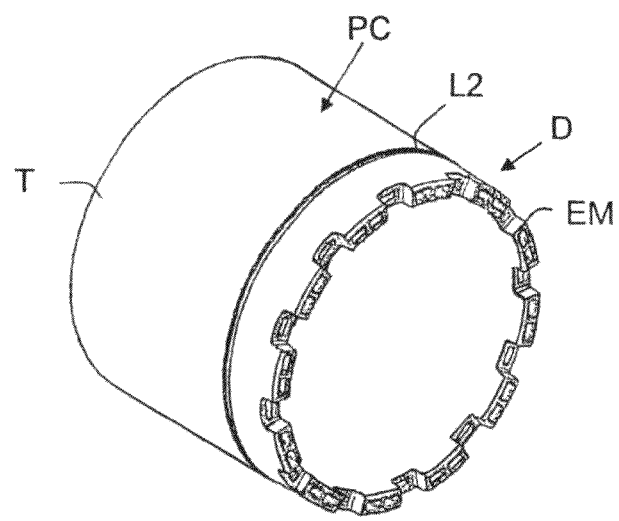
FIG. 12 is a diagrammatic perspective view of the female end of a VAM TOP type threaded tubular connection of FIGS. 1 and 5 to 11 provided with the protective device illustrated in FIGS. 1 to 11 and placed in its final position.
Figure 5A:
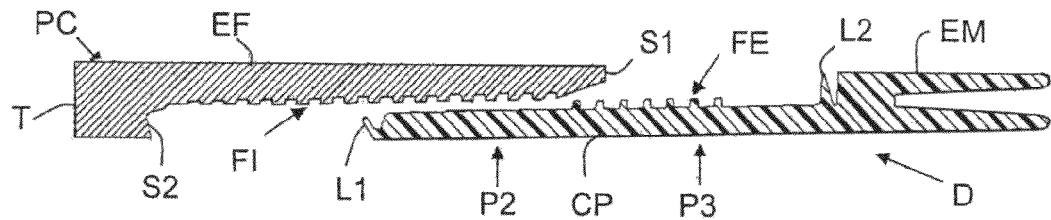
FIGS. 5A, 5B and 5C are diagrammatic partial sectional views along axis XX of the component of three intermediate stages of connection onto the female end in FIG. 1 of the protective device of FIG. 1, provided with the first and second sealing elements shown in FIGS. 3A-3B and 4A-4B.
Figure 5B:
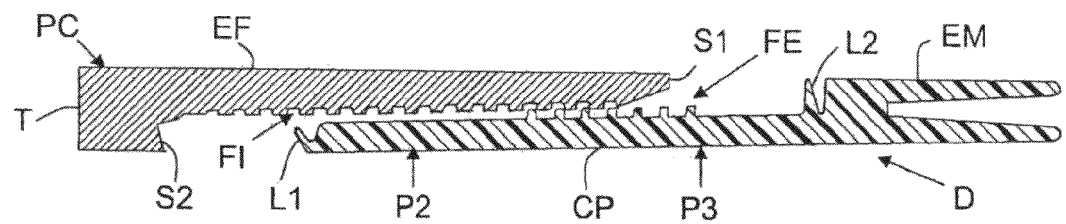
Figure 5C:
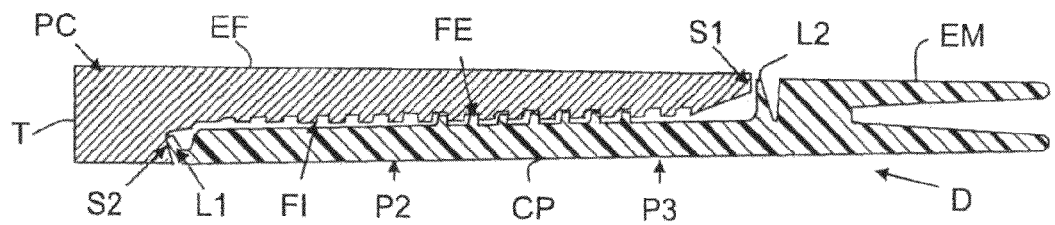
Figure 6A:
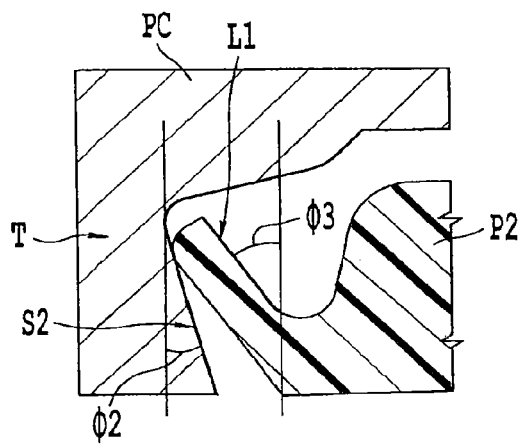
FIGS. 6A and 6B are enlargements of the connection zones [protective device/female end] of FIG. 5C, respectively comprising the first and second sealing elements in a first embodiment.
Figure 6B:
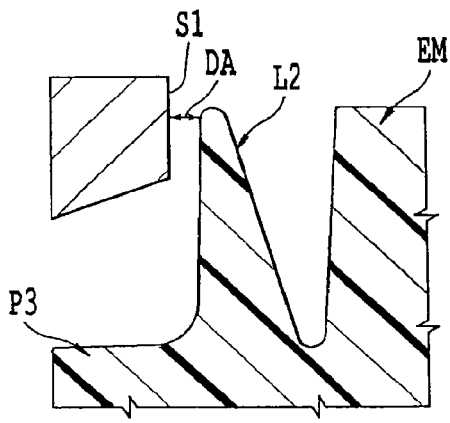

Device D is then in its final position (see FIG. 12). The first L1 and second L2 sealing elements have thus been considerably deformed by axial bending, and so they have both acquired, by surface contact with the internal annular surface S2 and the annular end surface S1 of the female end EF, an elastic energy which at least partially opposes unintentional (or spontaneous) unscrewing which may be caused by vibrations and/or large variations in temperature. This is termed an anti-unscrewing brake. The braking effect will be larger if more elastic energy is stored in the first L1 and second L2 sealing elements.

It will be understood that once the device D is placed in its final position, it provides perfect protection of the annular end S1 and internal S2 surfaces and the internal threading FI of the female end EF. It may be unscrewed at any time by exerting a larger force which opposes the sum of the frictional forces experienced by the first L1 and second L2 sealing elements without damaging the various portions of the female end EF, and without removing the lubricant (dry or semi-dry) which has been applied.

The protection provided by the device D is primarily mechanical, and so its body CP and any bumper element EM must have a certain rigidity while being capable of at least partially absorbing shocks. To this end, it may, for example, be produced by injecting (or moulding) a thermoplastic material into a suitable mould (it is thus a monoblock, i.e. produced in a single piece). It will be noted that the bumper element EM may optionally be a part which is attached to the body CP. In this case, it may be produced from a material which differs from that of the body CP. Of the various families of thermoplastic materials which may advantageously be used, the following may be cited in particular: mixtures based on polycarbonate, such as polycarbonate-polyester (PC-PBT or PC-PET), polyoxymethylene or polyacetal (POM) and high or ultra high density (PE-HD, PE-UHD) polyethylenes (PE).

Annex I of API 5CT specification edition 2005 sets out the requirements for threading protection devices, in particular minimum axial and diagonal (45°) shock resistance requirements for three temperatures (−46° C., +21° C. and +66° C.).

More particularly, a PE-HD may be selected which is produced by BASELL and sold under the trade name LUPOLEN 4261 AG UV 6005, a PE-UHD produced by TICONA and sold under the trade name GUR 5113, a PC-PBT produced by BAYER and sold under the trade name MAKROBLEND 57916, or a POM produced by DU PONT and sold under the trade name DELRIN 127UV.

The invention is not limited to the embodiments of the protective device described above, which are given solely by way of example, but it also encompasses any variations which could be envisaged by the skilled person which fall within the scope of the claims below.

Thus, the invention also concerns other types of female end than those described above (VAM TOP). As an example, it also concerns the female ends of threaded tubular connections, more particularly with an internal abutment, coupled (for example of the NEW VAM, VAM ACE, DINOVAM or VAM HW ST type) or integral flush or semi-flush (for example those of the VAM SL, VAM MUST, VAM HP, VAM HTF type). It also concerns the female ends of connections with no internal abutment (for example those of the VAM SLIJ II or VAM FJL type having an internal seal with radial interference fit).

The invention claimed is:

1. A device for protecting a female end of a component of a threaded tubular connection for drilling and working hydrocarbon wells, the female end of the component including at least one internal threading, an annular end surface, and an internal surface placed respectively upstream and downstream of the internal threading and respectively having first and second selected orientations, the device comprising:
a body having a longitudinal axis and including an external threading configured to cooperate with the internal threading; and
first and second annular flexible sealing elements placed respectively upstream and downstream of the external threading and configured to provide first and second seals respectively at the internal surface and the annular end surface,
wherein the first and second sealing elements have selected first and second orientations at least one of which differs by an angle of at least 10° from the corresponding second or first orientation of the female end before screwing the device onto the female end and are deformable by axial bending to acquire, by surface contact with the internal surface and the annular end surface, an energy that at least partially opposes any unintentional unscrewing when the female end is screwed onto the body into a final position, and the first sealing element is in a form of an annular tongue, the annular tongue being connected to the body via an interior periphery thereof and projects radially outwardly from the longitudinal axis,
wherein an internal surface of the female end is an annular abutment surface,
wherein the body is configured so that when screwing on and at a moment the first sealing element comes into contact with the internal surface, the second sealing element is positioned at an axial distance from the annular end surface which is in a range from about 0.5 mm to about 1 mm,
wherein the second sealing element projects radially outwardly from the longitudinal axis and from an outer circumferential surface of the body, and
wherein a distal end of the first sealing element, that is farthest from the interior periphery of the body, is configured to contact the internal surface of the female end downstream of the internal threading.

2. A device according to claim 1, wherein the body is configured so that during screwing on, the first sealing element comes into contact with the internal surface before the second sealing element comes into contact with the annular end surface.

3. A device according to claim 1, wherein the first orientation of the female end and the second orientation of the device initially differ by an angle in a range 10° to about 30°.

4. A device according to claim 3, wherein the angle between the first orientation of the female end and the second orientation of the device is about 15°.

5. A device according to claim 1, wherein the second orientation of the female end and the first orientation of the device initially differ by an angle in a range 10° to about 30°.

6. A device according to claim 5, wherein the angle between the second orientation of the female end and the first orientation of the device is about 15°.

7. A device according to claim 1, wherein the angle between the second orientation of the female end and the first orientation of the device reduces in the course of screwing on.

8. A device according to claim 1, wherein the second sealing element is in a form of an annular tongue.

9. A device according to claim 1, wherein the first and second sealing elements are integral with the body.

10. A device according to claim 1, wherein the body is extended downstream of the second sealing element by a bumper element.

11. A device according to claim 1, produced from a thermoplastic material.

12. A device according to claim 11, wherein the thermoplastic material is selected from a group comprising at least mixtures based on polycarbonate, polyoxymethylene or polyacetal (POM), and high density polyethylenes (PE-HD) or ultra high density polyethylenes (PE-UHD).

13. A device according to claim 11, produced in a single piece by molding a thermoplastic material.

14. A device according to claim 1, wherein the internal surface of the female end is a sealing surface with a radial interference fit.

15. A device according to claim 1, wherein the second sealing element includes a first inclined face that extends from the body and a second inclined face that extends from the body, respective ends of the first and second inclined faces meeting to form an acute angle, wherein the first inclined face is configured to seal against the annular abutment surface.

16. A threaded tubular connection for drilling and working hydrocarbon wells comprising:

a component comprising a female end including at least one internal threading, an annular end surface, and an internal surface placed respectively upstream and downstream of the internal threading and respectively having first and second selected orientations; and a device for protecting the female end including a body having a longitudinal axis and including an external threading configured to cooperate with the internal threading, and first and second annular flexible sealing elements placed respectively upstream and downstream of the external threading and configured to provide first and second seals respectively at the internal surface and the annular end surface, wherein the first and second sealing elements have selected first and second orientations at least one of which differs by an angle of at least 10° from the corresponding second or first orientation of the female end before screwing the device onto the female end and are deformable by axial bending to acquire, by surface contact with the internal surface and the annular end surface, an energy that at least partially opposes any unintentional unscrewing when the female end is screwed onto the body into a final position, and the first sealing element is in a form of an annular tongue, the annular tongue being connected to the body via an interior periphery thereof and projects radially outwardly from the longitudinal axis, wherein the second sealing element projects radially outwardly from the longitudinal axis and from an outer circumferential surface of the body, and wherein a distal end of the first sealing element, that is farthest from the interior periphery of the body, is configured to contact the internal surface of the female end downstream of the internal threading.

* * * * *